I. H. SPENCER.
VALVE.
APPLICATION FILED SEPT. 18, 1915.
1,251,453.
Patented Dec. 25, 1917.
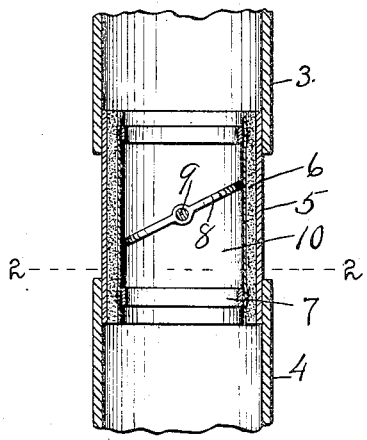
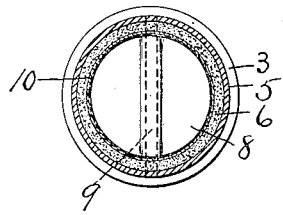
WITNESSES:
INVENTOR.
Ira H. Spencer.
BY
Arthur B Jenkins,
ATTORNEY.

UNITED STATES PATENT OFFICE.

IRA H. SPENCER, OF WEST HARTFORD, CONNECTICUT, ASSIGNOR TO THE ORGAN POWER COMPANY, OF HARTFORD, CONNECTICUT, A CORPORATION OF CONNECTICUT.

VALVE.

1,251,453.  Specification of Letters Patent.  Patented Dec. 25, 1917.

Application filed September 18, 1915. Serial No. 51,418.

*To all whom it may concern:*

Be it known that I, IRA H. SPENCER, a citizen of the United States, and a resident of West Hartford, in the county of Hartford and State of Connecticut, have invented a new and Improved Valve, of which the following is a specification.

My invention relates more especially to that class of valves employed in connection with pneumatic apparatus and in controlling the flow of air currents through conveying tubes connected with such apparatus, and an object of my invention, among others, is to provide a valve of the class above described that shall be particularly efficient in controlling the flow of air currents and without producing noise, my valve being especially applicable to use in connection with pneumatic apparatus when employed in connection with the operation of musical instruments.

One form of valve embodying my invention and in the construction and use of which the objects herein set out, as well as others, may be attained, is illustrated in the accompanying drawings, in which—

Figure 1 is a view in lengthwise central section through a portion of a conveying tube having my improved valve inserted therein.

Fig. 2 is a view in cross section through the same on plane denoted by the dotted line 2—2 of Fig. 1.

In the accompanying drawings I have shown a section of a conveying tube, which it will be understood is connected in any suitable manner with an apparatus of any desired type for creating flow of a current of fluid through said tube, and for the purpose of convenience in construction this tube is made in sections 3—4 with a connecting tube 5 extending between them, this connecting tube having a cushion lining 6 held in place as by clamping rings 7, and a valve 8 is supported upon a valve spindle 9 within the tube 5, the valve being operated in any suitable manner. All of the parts hereinbefore described are old and form the subject matter of a prior patent granted to me, and therefore of themselves constitute no part of my present invention.

In the operation of these valves, in order to secure a maximum efficiency as to noiselessness, the lining 6 is necessarily made of such material as will permit the seeping of air around the edge of the valve, and this to an objectional degree. To avoid this objection I insert a packing lining 10 within the cushion lining 6 against which packing lining the edge of the valve will rest when closed. This packing lining is constructed of any suitable material, impervious to air, and it will be preferably of a material that will produce little noise when the edge of the valve comes in contact with it. In the preferred form of construction the entire lining will be substantially in one piece, that is, the felt commonly constituting the cushion will be faced with rubber or similar material, and this prevents the objectionable leaking of the air past the valve, which has been present in my prior apparatus hereinbefore referred to.

While I have shown and described herein a satisfactory construction of the valve and packing to answer my purpose, this may be departed from to a greater or lesser degree and yet be within the spirit and intent of the invention.

I claim—

1. A conveying tube, a cushion lining located within the tube, a comparatively thin packing lining covering the inner face of the cushion lining, and a valve movably supported within the tube with its edge, when closed, in contact with said packing lining.

2. A conveying tube, a cushion lining covering the inner surface of the tube for a portion of its length and having a comparatively thin facing impervious to air, a valve pivotally mounted within the tube with its edge, when closed, in contact with said facing, and clamping rings pressing against the inner surface of said lining to hold it in place.

3. A conveying tube comprising two sections and a connecting tube extending between and continuing the passage through the sections, a comparatively thin facing impervious to air lining the said connecting tube, a cushion lining underlying said facing, and a valve movably supported within the tube with its edge, when closed, in contact with said packing lining.

4. A conveying tube, a cushion lining located within the tube and composed of a substance pervious to air, a packing lining covering the inner surface of the cushion lining and impervious to air, and a valve pivotally supported within the tube and of a form and size whereby its edge contacts with said lining by a wedging action.

IRA H. SPENCER.